United States Patent
Kajiyama

(10) Patent No.: US 8,228,533 B2
(45) Date of Patent: Jul. 24, 2012

(54) IMAGE PROCESSING SYSTEM, IMAGE PROCESSING METHOD, COMPUTER READABLE MEDIUM, AND COMPUTER DATA SIGNAL

(75) Inventor: Hajime Kajiyama, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1372 days.

(21) Appl. No.: 11/842,208

(22) Filed: Aug. 21, 2007

(65) Prior Publication Data
US 2008/0174828 A1    Jul. 24, 2008

(30) Foreign Application Priority Data
Jan. 22, 2007    (JP) .................................. 2007-011087

(51) Int. Cl.
*H04N 1/00* (2006.01)
(52) U.S. Cl. ........................ 358/1.15; 358/1.14; 358/401
(58) Field of Classification Search .................. 382/181; 358/468, 402, 401, 1.15, 1.14
See application file for complete search history.

(56) References Cited

U.S. PATENT DOCUMENTS

| | | | | |
|---|---|---|---|---|
| 6,633,413 | B1 * | 10/2003 | Schlank et al. | 358/468 |
| 6,947,182 | B1 * | 9/2005 | Kumagai | 358/402 |
| 7,216,344 | B2 | 5/2007 | Cobb et al. | |
| 7,330,282 | B2 * | 2/2008 | Matsumoto | 358/1.15 |
| 7,760,944 | B2 * | 7/2010 | Uchikawa | 382/181 |
| 2006/0197724 | A1 | 9/2006 | Sakai | |
| 2008/0292268 | A1 * | 11/2008 | Hashiura et al. | 386/75 |

FOREIGN PATENT DOCUMENTS

| | | |
|---|---|---|
| JP | 2000-305757 A | 11/2000 |
| JP | 2002-103742 A | 4/2002 |
| JP | 2005-251204 A | 9/2005 |
| JP | 2006-198880 A | 8/2006 |
| JP | 2006-243581 A | 9/2006 |

OTHER PUBLICATIONS

Japanese Office Action dated Oct. 26, 2010 for Japanese Application No. 2007-011087 and partial translation.

* cited by examiner

*Primary Examiner* — Charlotte M Baker
*Assistant Examiner* — Ashish K Thomas
(74) *Attorney, Agent, or Firm* — Sughrue Mion, PLLC

(57) ABSTRACT

There is provided is an image processing system including an image processing device, which receives an image formation instruction containing information on a formation target image and output destination designation information designating an output destination of the image formation instruction, which are output by an image forming device control program, transmits the image formation instruction to an image forming device associated with the output destination designation information, and produces, when the image formation instruction is transmitted to the image forming device, a log image corresponding to the formation target image based on the image formation instruction.

3 Claims, 4 Drawing Sheets

SETTING :
   JOB ATTRIBUTE : IMAGE LOG : ON
   JOB ATTRIBUTE : xxxxx : yyyy
   JOB ATTRIBUTE : zzzzz : 0123
- 
- 
-

IMAGE PROCESSING SYSTEM, IMAGE PROCESSING METHOD, COMPUTER READABLE MEDIUM, AND COMPUTER DATA SIGNAL

CROSS-REFERENCE TO RELATED APPLICATIONS

This application is based on and claims priority under 35 USC 119 from Japanese Patent Application No. 2007-011087 filed Jan. 22, 2007.

BACKGROUND

1. Technical Field

The present invention relates to an image processing system, an image processing method, a computer readable medium, and computer data signal.

2. Related Art

In a case where an image processing device such as a personal computer causes an image forming device (e.g., printer) to form an image, a program for controlling the image forming device (device driver program) is installed in the image processing device. Among image forming device control programs, there are programs having a function of producing a saved image (log image) that corresponds to a formation target image to be formed by the image forming device. In those cases, the image processing devices which execute the image forming device control programs produce the saved image when causing the image forming devices to form the formation target images, and record the produced saved images in a server computer such as a log server. With this structure, by searching for the saved images stored in the log server or the like, it is possible to search for what kinds of images have been output by the image forming devices in the past.

SUMMARY

According to an aspect of the present invention, there is provided an image processing system including an image processing device, one or more image forming devices, and a log server. The image processing device includes: an image formation instruction transmission unit that receives an image formation instruction containing information on a formation target image and output destination designation information designating an output destination of the image formation instruction which are output by an image forming device control program, and transmits the image formation instruction to an image forming device associated with the output destination designation information among the one or more image forming devices; a log image production unit that produces a log image corresponding to the formation target image based on the image formation instruction when the image formation instruction is transmitted to the image forming device by the image formation instruction transmission unit; and a transmission unit that transmits the produced log image to the log server. The image forming device associated with the output destination instruction carries out image formation processing based on the image formation instruction transmitted from the image formation instruction transmission unit. The log server saves the log image transmitted from the transmission unit as log information.

BRIEF DESCRIPTION OF THE DRAWINGS

An exemplary embodiment of the present invention will be described in detail based on the following figures, wherein:

FIG. 3 is an explanatory diagram showing an example of information contained in an image formation instruction.

DETAILED DESCRIPTION

Figure 1:
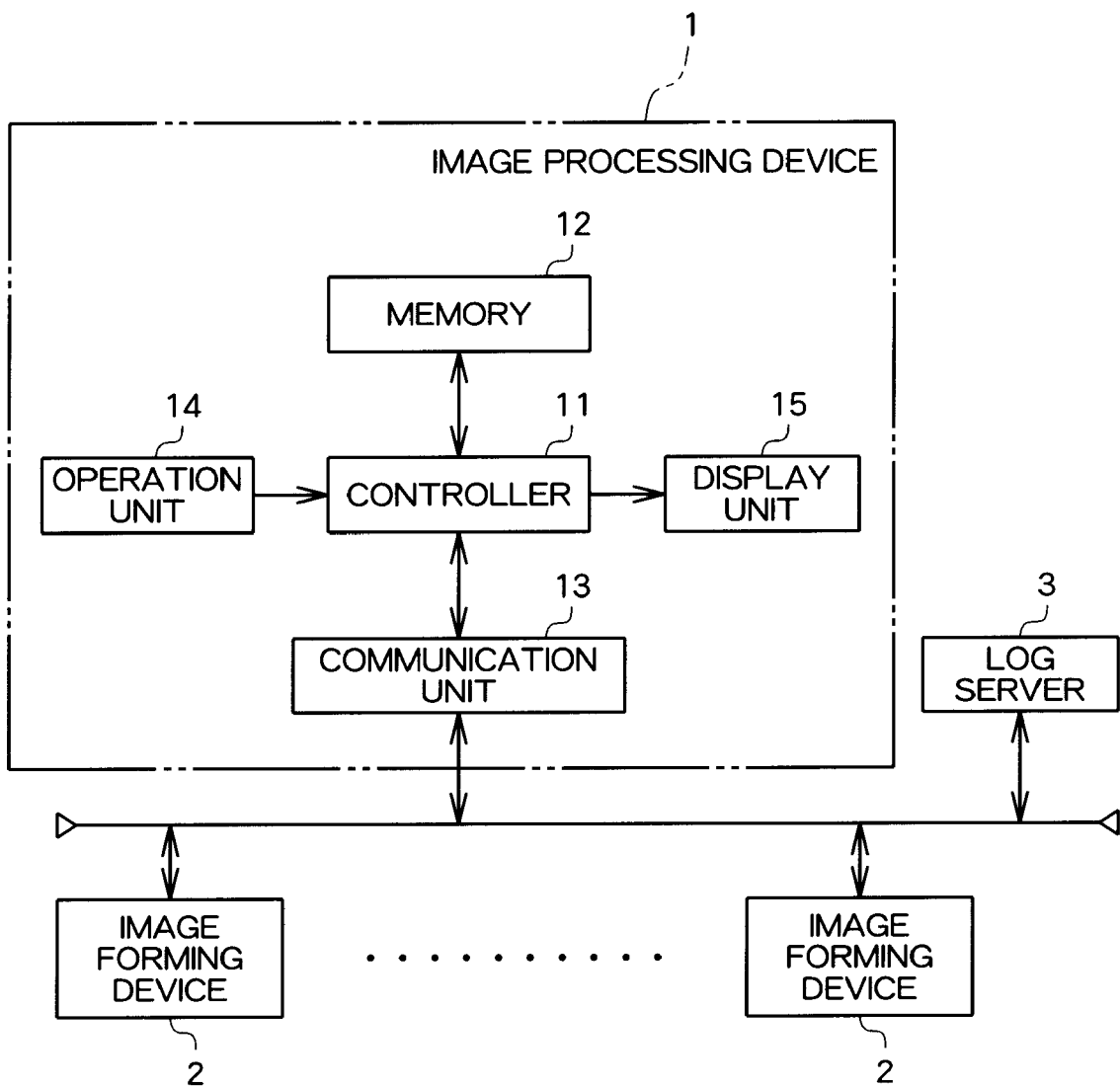
FIG. 1 is a block diagram showing an example of a structure of an image processing device according to the exemplary embodiment of the present invention.

Hereinafter, an exemplary embodiment of the present invention will be described with reference to the drawings. As shown in FIG. 1, an image processing device 1 according to the exemplary embodiment of the present invention is connected to multiple image forming devices 2 and a log server 3 via a communication line so that data communication can be carried out therebetween.

The image processing device 1 is, for example, a personal computer, and includes a controller 11, a memory 12, a communication unit 13, an operation unit 14, and a display unit 15.

The controller 11 is, for example, a CPU, and operates according to a program stored in the memory 12. In this exemplary embodiment, the controller 11 transmits an image formation instruction to the image forming device 2 according to an operation instruction and the like of a user, and produces a saved image (log image) to transmit the image to the log server 3. An example of processing executed by the controller 11 will be described later.

The memory 12 is a computer readable information storage medium, and includes at least one of a memory element such as a RAM or a ROM, and a disk device such as a hard disk. The program executed by the controller 11 is stored in the memory 12. Further, the memory 12 also functions as a work memory of the controller 11.

The communication unit 13 is a network interface such as a modem or a LAN card, and transmits information via a communication network according to an instruction from the controller 11. In addition, the communication unit 13 receives information transmitted via the communication network and outputs the information to the controller 11.

The operation unit 14 is, for example, a keyboard or a mouse, and receives an operation instruction input by the user and outputs contents of the operation instruction to the controller 11. The display unit 15 is, for example, a display, and displays information by an instruction from the controller 11.

The image forming device 2 is, for example, a printer or a multi-function machine (e.g., image processing device having any of multiple functions including a printing function, scanning function, copying function, facsimile transmission function, and the like), and forms an image on a recording medium such as paper based on the image formation instruction transmitted from the image processing device 1.

The log server 3 is, for example, a server computer, and receives data of a saved image transmitted from the image processing device 1 and records the data as a part of log information. The log information is referred to later in a search for images formed by the image forming device 2.

Figure 2:
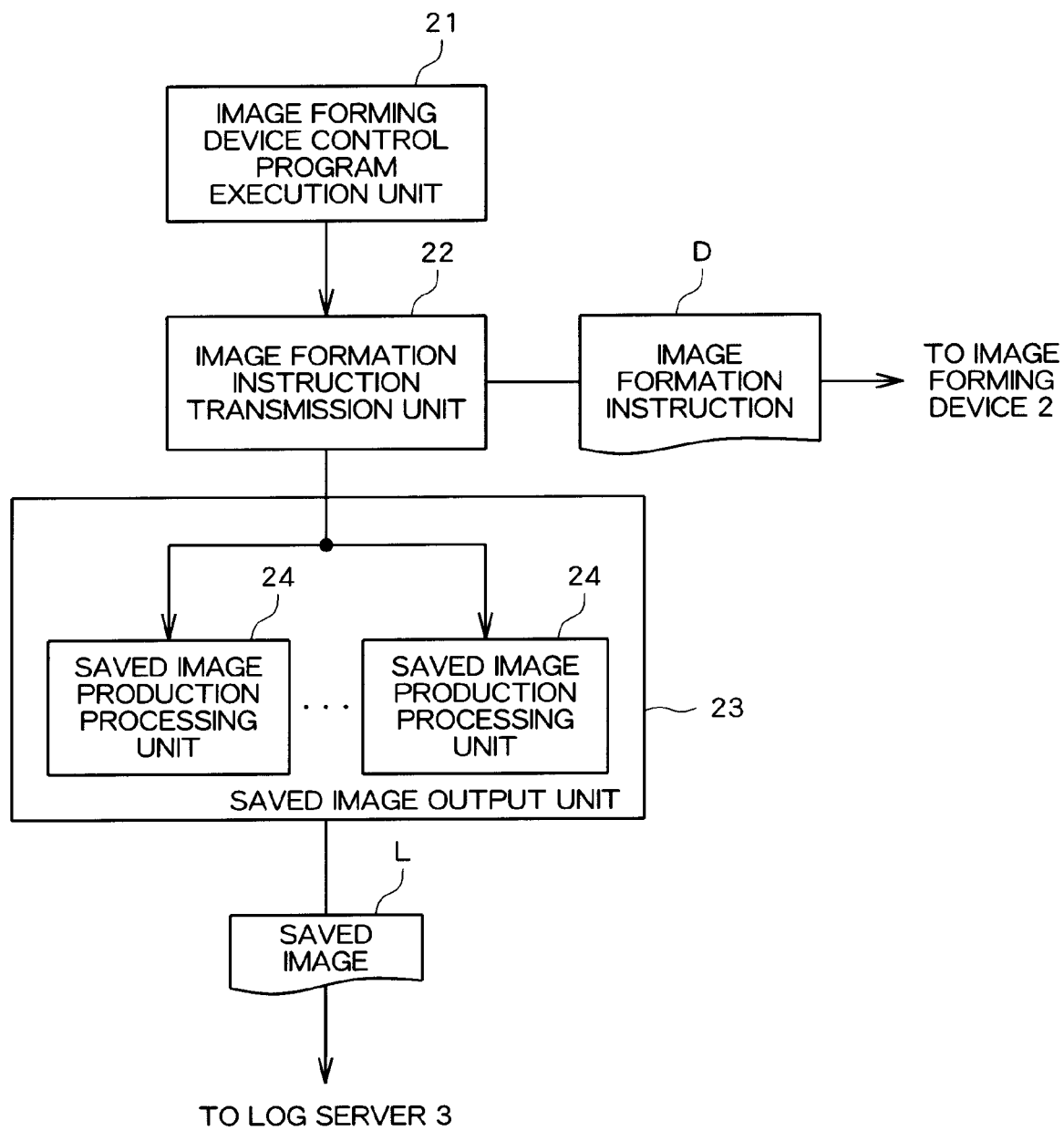
FIG. 2 is a functional block diagram showing an example of functions of the image processing device according to the exemplary embodiment of the present invention.

Next, functions realized by the image processing device 1 will be described. As shown in FIG. 2, the image processing device 1 functionally includes an image forming device control program execution unit 21, an image formation instruction transmission unit 22, and a saved image output unit 23.

Further, the saved image output unit 23 includes multiple saved image production processing units 24. Those functions can be realized by the controller 11 executing the program stored in the memory 12, for example. The program may be provided by being recorded on various computer readable information storage media such as a CD-ROM and a DVD-ROM, or may be provided via the communication network such as the Internet.

The image forming device control program execution unit 21 executes an image forming device control program (e.g., printer driver program) stored in the memory 12. The image forming device control program execution unit 21 produces an image formation instruction D containing information on a formation target image, based on data of the formation target image obtained by executing an application program, for example. The image formation instruction D in this case is, for example, instruction data written in a predetermined data format, such as a page description language (PDL), for instructing the image forming device 2 to form the formation target image.

In addition, the image forming device control program execution unit 21 outputs, together with the image formation instruction D, output destination designation information designating an output destination of the image formation instruction D, which has been selected based on the operation instruction by the user with respect to the operation unit 14, for example. The output destination designation information is, for example, information on a network address (e.g., IP address) of the image forming device 2 or a printer port, and is used for specifying the image forming device 2 that processes the image formation instruction D. Note that the printer port in this case may be a virtual port.

The image formation instruction transmission unit 22 receives the image formation instruction D and the output destination designation information output by the image forming device control program execution unit 21, and transmits the image formation instruction D to the image forming device 2 associated with the output destination designation information. This function may be realized by a port monitor function of Microsoft WINDOWS, for example.

Further, in this exemplary embodiment, the image formation instruction transmission unit 22 outputs instruction information for instructing production of a saved image L that corresponds to the formation target image, as well as transmitting the image formation instruction D. The instruction information contains an activation command for activating a predetermined saved image production program, for example.

The saved image L in this case is an image which expresses the formation target image and that written in a predetermined data format, which is to be a target of saving by the log server 3. The saved image L is, for example, an image obtained by reducing a size of the formation target image to a predetermined image size and converting a format thereof into a data format including a portable document format (PDF) or the like.

Further, the image formation instruction transmission unit 22 may specify a type of the received image formation instruction D and output information corresponding to the specified type as at least a part of the instruction information described above. In this case, the image formation instruction transmission unit 22 specifies the type of the image formation instruction D based on the output destination designation information that has been received together with the image formation instruction D, for example. Alternatively, the image formation instruction transmission unit 22 may specify the type of the image formation instruction D by referring to the contents of the image formation instruction D.

As a specific example, it is assumed that the image formation instruction D is written by any one of multiple kinds of data formats that can be processed by the respective multiple image forming devices 2 connected to the image processing device 1. In this case, the image formation instruction transmission unit 22 specifies the type (data format) of the received image formation instruction D based on the output destination designation information, and outputs the activation command for activating the saved image production program associated with the specified type, as the instruction information.

The saved image output unit 23 produces the saved image L that corresponds to the formation target image based on the image formation instruction D. Further, the saved image output unit 23 outputs and transmits the produced saved image L to the log server 3. In this case, the saved image output unit 23 produces the saved image L when the image formation instruction D is transmitted to the image forming device 2 by the image formation instruction transmission unit 22. Specifically, for example, the saved image output unit 23 starts the production of the saved image L according to the instruction information output by the image formation instruction transmission unit 22.

Further, as described above, in this exemplary embodiment, the saved image output unit 23 is composed of the multiple saved image production processing units 24. Each of the saved image production processing units 24 executes the saved image production program described above to produce a saved image L corresponding to the formation target image. In this case, each of the saved image production processing units 24 is associated with any of the multiple types of the image formation instruction D, and has a function of producing the saved image L by a processing method corresponding to the type associated therewith. Specifically, for example, each of the saved image production processing units 24 has a function of analyzing the contents of the image formation instruction D in a corresponding data format, and converting data of the formation target image contained in the image formation instruction D into a saved image L of a predetermined data format. In this case, the saved image production processing unit 24 associated with the type of the image formation instruction D that has been received by the image formation instruction transmission unit 22 executes production processing of the saved image L, based on the instruction information corresponding to the type of the image formation instruction D output by the image formation instruction transmission unit 22.

Note that in the descriptions above, when the image formation instruction transmission unit 22 transmits the image formation instruction D, the saved image output unit 23 always produces and outputs the saved image L. However, the image processing device 1 may select whether to produce the saved image L according to an instruction of a user and the like. For example, the image forming device control program execution unit 21 causes the display unit 15 to display a setting screen for prompting the user to select whether to execute the production of the saved image L. After that, the image forming device control program execution unit 21 selects whether to execute the production of the saved image L according to the operation instruction by the user with respect to the operation unit 14 when the setting screen is displayed.

In this case, the image forming device control program execution unit 21 embeds, when producing the image formation instruction D, information indicating a result of the selection in the image formation instruction D. FIG. 3 is an explanatory diagram partially exemplifying the image formation instruction D in which the information as described above has been embedded. In the example of FIG. 3, a value "ON" is set for "image log" which is one of various job attributes. Here, the value "ON" indicates that production of the saved image L is to be executed. Unlike the example of the figure, setting of a value "OFF" for the "image log" indicates that the production of the saved image L is not to be executed.

Upon receiving the image formation instruction D, the image formation instruction transmission unit 22 refers to the embedded information indicating the result of the selection to thereby judge whether to carry out production of the saved image L. When it is judged that the production of the saved image L is to be carried out, the image formation instruction transmission unit 22 outputs instruction information that instructs the saved image output unit 23 to produce the saved image L.

Figure 4:
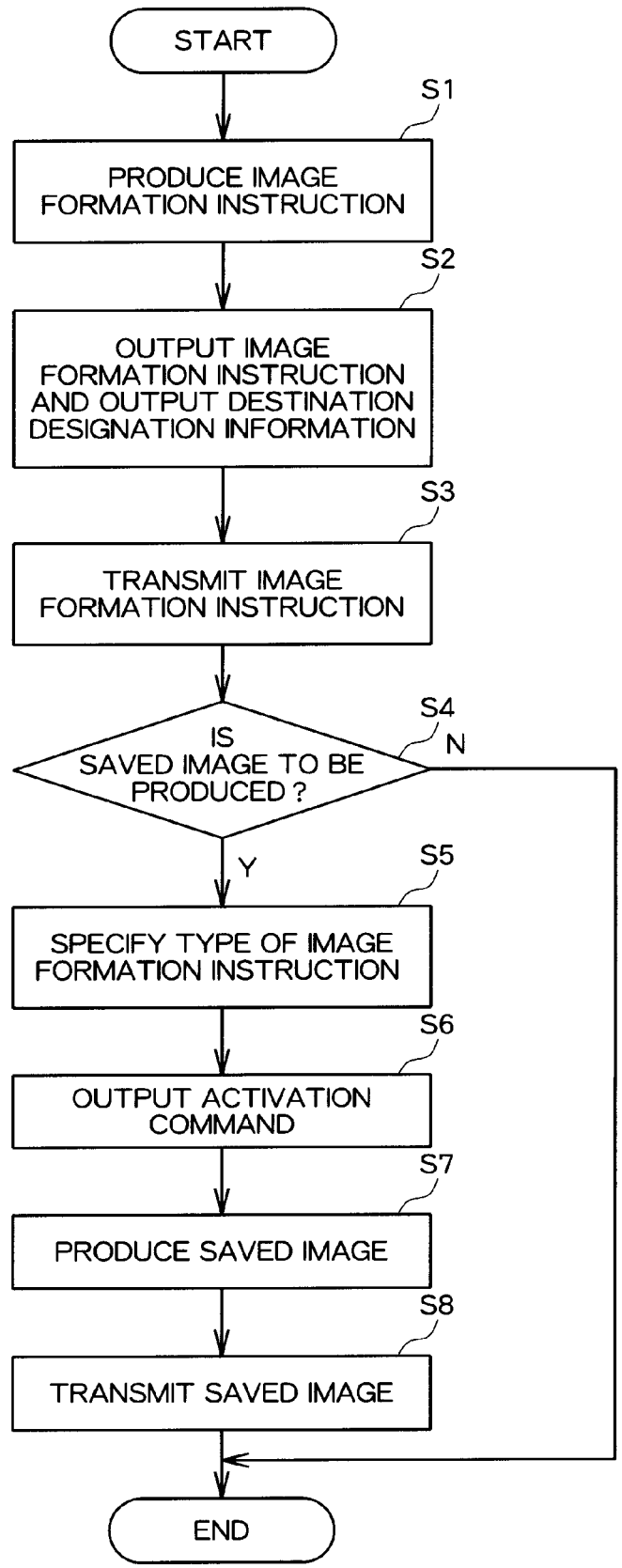
FIG. 4 is a flowchart of an example of processing executed by the image processing device according to the exemplary embodiment of the present invention.

Here, an example of a flow of processing executed by the image processing device 1 according to this exemplary embodiment will be described with reference to the flowchart of FIG. 4.

First, the image forming device control program execution unit 21 produces an image formation instruction D based on an operation instruction by a user, or the like (S1). Then, the image forming device control program execution unit 21 outputs the image formation instruction D produced in Step S1 together with output destination designation information (S2).

The image formation instruction transmission unit 22 receives the image formation instruction D and the output destination designation information that have been output in Step S2, and transmits the image formation instruction D first to the image forming device 2 of the output destination designated by the output destination designation information (S3). The image forming device 2 forms the formation target image on a recording medium such as paper, according to the transmitted image formation instruction D.

Further, the image formation instruction transmission unit 22 refers to the image formation instruction D to judge whether to execute production of the saved image L (S4). When it is judged that the production of the saved image L is not to be executed, the image formation instruction transmission unit 22 ends the processing. On the other hand, when it is judged in the process of Step S4 that the production of the saved image L is to be executed, the image formation instruction transmission unit 22 specifies a type of the image formation instruction D transmitted in Step S3 (S5) and outputs an activation command for activating the saved image production program corresponding to the specified type (S6).

Subsequently, in response to the activation command output in Step S6, the saved image production processing unit 24 corresponding to the type of the image formation instruction D specified in Step S5 produces a saved image L based on the image formation instruction D (S7). In addition, the saved image output unit 23 transmits the saved image L produced in Step S7 to the log server 3 (S8). In this case, for example, the saved image output unit 23 transmits the saved image L to the log server 3 according to a protocol such as a simple object access protocol (SOAP). The transmitted saved image L is accumulated in the log server 3.

Note that the exemplary embodiment of the present invention is not limited to that described above. For example, when the image processing device 1 is connected to only one image forming device 2 or connected to image forming devices 2 that execute processing corresponding to image formation instructions of the same type, the saved image output unit 23 does not need to be provided with the multiple saved image production processing units 24. In this case, the saved image output unit 23 produces the saved image L based on the image formation instruction D which is constantly of a predetermined type.

Further, the image processing device 1 may accumulate the produced saved image L in the memory 12 of the own device instead of transmitting the saved image L to the log server 3.

The foregoing description of the exemplary embodiments of the invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing system, comprising:
   an image processing device that generates an image formation instruction, the image formation instruction comprising image data of an image and job attribute data that indicates whether the image processing device produces a log image corresponding to the image;
   a first image forming device that receives from the image processing device the image formation instruction in a first page description language (PDL) data format processed by the first image forming device, processes the image formation instruction in the first PDL data format, and outputs the image to a recording medium based on the processed image formation instruction in the first PDL data format;
   a second image forming device that receives from the image processing device the image formation instruction in a second PDL data format processed by the second image forming device, processes the image formation instruction in the second PDL data format, and outputs the image to a recording medium based on the processed image formation instruction in the second PDL data format; and
   a log server,
   the image processing device comprising:
      an image forming device control program execution unit that receives the image data of the image and output designation information designating one of the first image forming device and the second image forming device as an output destination of the image formation instruction, generates the image formation instruction in the first PDL data format if the output destination is the first image forming device and generates the image formation instruction in the second PDL data format if the output destination is the second image forming device, and outputs the generated image formation instruction and the output destination;
      an image formation instruction transmission unit that receives from the image forming device control program execution unit the image formation instruction generated by the image forming device control program execution unit and the output destination, transmits the image formation instruction to the designated one of the first image forming device and the second image forming device associated with the output destination designation information, and outputs instruction information that instructs formation of the log image based on the job attribute data, the instruction information comprising type information that indicates a type of the image formation instruction as one of a first type and a second type corresponding to the one of the first image forming device and the second image forming device of the output destination;

a log image production unit that produces the log image using one of a first application program corresponding to the first type and a second application program corresponding to the second type, based on the type of the image formation instruction, when the image formation instruction is transmitted to the one of the first image forming device and the second image forming device by the image formation instruction transmission unit; and a transmission unit that transmits to the log server the produced log image, wherein the log server saves the log image as log information.

2. An image processing method, comprising:

receiving image data of an image and output designation information designating one of a first image forming device and a second image forming device as an output destination of an image formation instruction that instructs the one of the first image forming device and the second image forming device to process the image formation instruction and output the image to a recording medium based on the processed image formation instruction, the first image formation device processing the image formation instruction in a first page description language (PDL) data format processed by the first image forming device and the second image formation device processing the image formation instruction in a second PDL data format processed by the second image forming device;

generating the image formation instruction in the first PDL data format if the output destination is the first image forming device and generating the image formation instruction in the second PDL data format if the output destination is the second image forming device, the image formation instruction comprising the image data of the image and job attribute data that indicates whether to produce a log image corresponding to the image;

transmitting the generated image formation instruction to the designated one of the first image forming device and the second image forming device associated with the output destination designation information;

determining whether the job attribute data indicates to produce the log image and producing, when the image formation instruction is transmitted to the one of the first image forming device and the second image forming device and if the job attribute data indicates to produce the log image, the log image produced using one of a first application program corresponding to a first type of the image formation instruction and a second application program corresponding to the second type of the image formation instruction, the first application program converting image data in the first PDL format of the first image forming device and the second application program converting image data in the second PDL format of the second image forming device; and transmitting to a log server the log image, wherein the log server saves the log image as log information.

3. A non-transitory computer readable medium storing a program causing a computer to execute a process comprising:

receiving image data of an image and output designation information designating one of a first image forming device and a second image forming device as an output destination of an image formation instruction that instructs the one of the first image forming device and the second image forming device to process the image formation instruction and output the image to a recording medium based on the processed image formation instruction, the first image formation device processing the image formation instruction in a first page description language (PDL) data format processed by the first image forming device and the second image formation device processing the image formation instruction in a second PDL data format processed by the second image forming device;

generating the image formation instruction in the first PDL data format if the output destination is the first image forming device and generating the image formation instruction in the second PDL data format if the output destination is the second image forming device, the image formation instruction comprising the image data of the image and job attribute data that indicates whether to produce a log image corresponding to the image;

transmitting the generated image formation instruction to the designated one of the first image forming device and the second image forming device associated with the output destination designation information;

determining whether the job attribute data indicates to produce the log image and producing, when the image formation instruction is transmitted to the one of the first image forming device and the second image forming device and if the job attribute data indicates to produce the log image, the log image produced using one of a first application program corresponding to a first type of the image formation instruction and a second application program corresponding to the second type of the image formation instruction, the first application program converting image data in the first PDL format of the first image forming device and the second application program converting image data in the second PDL format of the second image forming device; and transmitting to a log server the log image, wherein the log server saves the log image as log information.

* * * * *